United States Patent Office 2,703,808
Patented Mar. 8, 1955

2,703,808

PENTAERYTHRITYL SULFONATES

Edwin R. Buchman, Altadena, Calif., assignor to Research Corporation, New York, N. Y., a corporation of New York No Drawing. Application September 17, 1951,
Serial No. 247,023

12 Claims. (Cl. 260—456)

This invention relates to new alkyl and aryl sulfonates of pentaerythritol and methods of making the same.

It has previously been disclosed that the reaction of pentaerythritol with p-toluenesulfonchloride produces pentaerythritol derivatives containing chlorine.

It has now been found that by acting upon pentaerythritol with chlorides of alkyl and aryl sulfonic acids in the presence of pyridine at ordinary room temperatures, preferably not exceeding about 30° C., pentaerythrityl sulfonates of the general formula $$C(CH_2OSO_2R)_4$$

are obtained in good yield.

The following is an example of the procedure generally applicable to the production of the sulfonate esters of the invention:

To a mixture of 1.36 g (0.01 mole) of pentaerythritol (M. P. 254–255°) and 10 g. of pyridine is added, in small portions with cooling, 0.045 mole of the appropriate sulfonyl chloride. The mixture is allowed to stand overnight, whereupon there is added 40 cc. of dilute hydrochloric acid (1:1). After cooling the mixture, the precipitated ester, if solid, is filtered, washed thoroughly with water, dried, and recrystallized from a suitable solvent. When the precipitate resulting from the dilution of the reaction mixture with hydrochloric acid is an oil, the separate oily product is washed with water, dried, and crystallized from the solvent indicated in the table.

The following table gives the properties of typical pentaerythrityl sulfonates of the invention and also lists solvents suitable for their crystallization:

Pentaerythrityl sulfonates—$C(CH_2OSO_2R)_4$ 

| R | Crystalline form | Solvent | M. P., ° C. |
|---|---|---|---|
| methyl | rhombs | acetonitrile | 209–209.5 |
| ethyl | prisms | methanol | 82.5–83 |
| phenyl | do | ethanol-acetone | 103 |
| 4-bromophenyl | needles | acetone | 170.5–171 |
| p-tolyl | rhombic prisms | methanol-acetone | 154.5–155.5 |
| 2,5-dimethylphenyl | needles | acetone | 139–139.5 |
| 3,4-dichlorophenyl | do | do | 165.5–166.5 |
| 3-nitrophenyl | do | do | 180.5–181.5 |
| 4-nitrophenyl | stubby needles | acetonitrile | 207.5–209 |
| β-naphthyl | pointed prisms | do | 167.5–168.5 |

Typical of the pentaerythrityl sulfonates of the invention is the benzene sulfonate. Used in place of pentaerythrityl bromide in the reaction with sodium iodide described by Schurink (Organic Synthesis, vol. II, page 476, 1943) it gives pentaerythrityl iodide.

Use of the sulfonate esters in prodcing other derivatives of pentaerythritol is illustrated by the following examples:

*Pentaerythrityl bromide.*—A mixture of 6.3 g. of pentaerythrityl benzenesulfonate, 5.6 g. of sodium bromide, and 10 cc. of diethylene glycol is heated at 140±5° C. for nineteen hours. To the resulting orange solution and suspended solids is added 75 cc. of water, and the undissolved solids are removed by filtration, yielding 3.6 g. of crude pentaerythrityl bromide. Recrystallization from acetone results in the recovery of 3.3 g. (94%) of thin, translucent flakes, M. P. 157–157.5° C.

*Pentaerythrityl thiocyanate.*—A mixture of 13.7 g. of pentaerythrityl benzenesulfonate, 7.0 g. of sodium thiocyanate and 8 cc. of diethylene glycol is heated at 140° C., with stirring, for one-half hour. The resulting yellowish mixture is washed with water by thorough trituration, and is recrystallized from acetone yielding 1.9 g. (30%) of pentaerythrityl thiocyanate, which after two additional crystallizations from acetonitrile melts at 215–216° C.

*Neopentane.*—In a dry, 1-liter, three-necked, round-bottomed flask, equipped with a mercury-sealed, mechanical stirrer (Hershberg), dropping funnel, and condenser the top of which is connected to a Dry-Ice trap protected with a calcium chloride tube, is placed 100 ml. of dry, distilled tetrahydrofuran. To this is added 22.8 g. of lithium aluminum hydride, the bulk of which dissolves. A solution of 84 g. of pentaerythrityl benzenesulfonate in 250 ml. of tetrahydrofuran is then added dropwise to the stirred solution. The resulting mixture is allowed to stand overnight, and is then warmed in water-bath at 75–80° C. until the evolution of gas ceases. The distillate which has collected in the Dry-Ice trap is distilled twice and then fractionated, the first fraction, B. P. 9.2–9.4° C./745 mm., being collected. The distillate, when frozen and then allowed to warm slowly in a bath at —10 to —20° C., begins to melt at —25.5° C. and is completely liquid at —20° C. The bulk of the solid melts at —21 to —20° C.; yield 1.7 g. (20%) of neopentane.

I claim:

1. The method which comprises treating pentaerythritol in pyridine with a sulfonylchloride of the general formula $R \cdot SO_2Cl$ wherein R is a member of the group consisting a alkyl and aryl radicals at a temperature not substantially exceeding 30° C. and recovering the pentaerythrityl sulfonate of the general formula $C(CH_2OSO_2R)_4$ thereby produced.

2. The method which comprises treating pentaerythritol in pyridine with an alkyl sulfonylchloride at a temperature not substantially exceeding 30° C. and recovering the pentaerythrityl alkyl sulfonate thereby produced.

3. The method which comprises treating pentaerythritol in pyridine with an aryl sulfonylchloride at a temperature not substantially exceeding 30° C. and recovering the pentaerythrityl aryl sulfonate thereby produced.

4. Pentaerythrityl sulfonates of the general formula $C(CH_2OSO_2R)_4$ wherein R is a member of the group consisting of alkyl and aryl radicals.

5. Pentaerythrityl alkyl sulfonates.

6. Pentaerythrityl aryl sulfonates.

7. As a new compound, pentaerythrityl methyl sulfonate.

8. As a new compound, pentaerythrityl ethyl sulfonate.

9. As a new compound, pentaerythrityl phenyl sulfonate.

10. As a new compound, pentaerythrityl tolyl sulfonate.

11. As a new compound, pentaerythrityl dichlorophenyl sulfonate.

12. The method of producing pentaerythrityl sulfonates which comprises reacting in pyridine an alkyl sulfonylchloride with pentaerythritol, in the molar ratio of in excess of four moles of the sulfonylchloride for each mole of pentaerythritol, at a temperature not substantially exceeding 30° C. and recovering the pentaerythrityl alkyl sulfonate thereby produced.

References Cited in the file of this patent

UNITED STATES PATENTS 2,441,595      Rapoport      May 18, 1948

OTHER REFERENCES

Kraft: Chem. Abstracts, vol. 41, column 1207h (1947) citing Kraft, J. Gen. Chem. (U. S. S. R.), vol. 16, pp. 667–684 (1946).